UNITED STATES PATENT OFFICE.

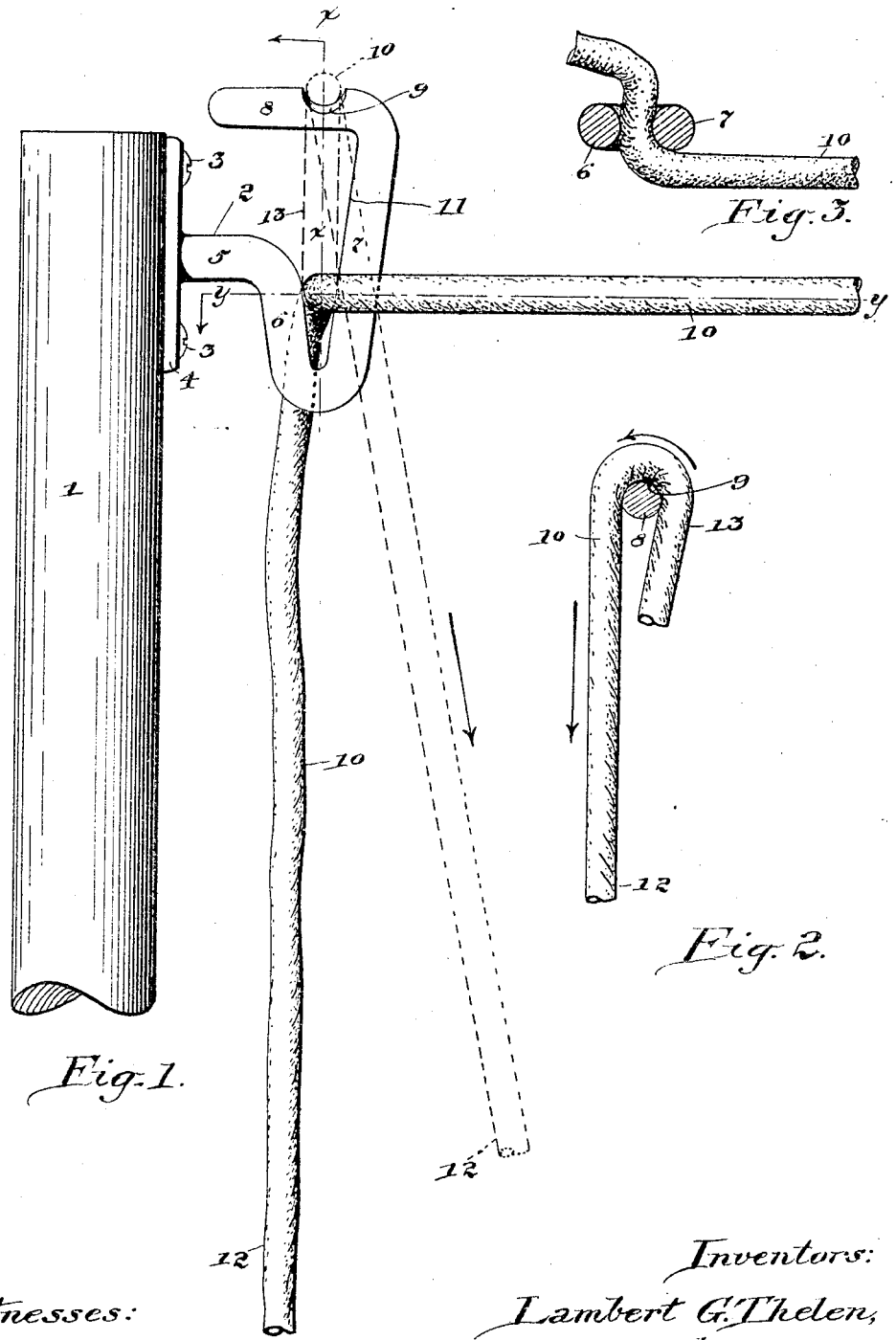

LAMBERT G. THELEN AND JOHN FLOOD, OF CHICAGO, ILLINOIS.

CLOTHES-LINE HOOK.

944,057.

Specification of Letters Patent. Patented Dec. 21, 1909.

Application filed March 1, 1909. Serial No. 480,629.

*To all whom it may concern:*

Be it known that we, LAMBERT G. THELEN and JOHN FLOOD, citizens of the United States, residing at Chicago, county of Cook, and State of Illinois, have invented certain new and useful Improvements in Clothes-Line Hooks, of which the following is a specification.

Our invention relates to improvements in clothes line hooks, and has for its object to provide a simple and inexpensive device of this character that shall be strong, efficient and durable.

A further object of our invention is to provide in the hook a means for gripping the line, and a further object is to provide means whereby the line may be readily released from the gripping means.

Other objects will appear hereinafter.

With these objects in view our invention consists in such a novel construction and arrangement of parts all as will be hereinafter fully described and particularly pointed out in the appended claims.

Our invention will be more readily understood by reference to the accompanying drawings forming a part of this specification, and in which, Figure 1 is a side elevation of a clothes line post and our improved hook attached thereto, Fig. 2 is a detail section taken on the line $x$ $x$ of Fig. 1, and Fig. 3 is also a detail section taken on the line $y$ $y$ of Fig. 1.

Referring now to the drawings 1 indicates the clothes line post and 2 the clothes line hook secured thereto by means of the screws 3. The hook 2 is supposed to be in such an elevated position as not to be easily reached by a person, so that means are incorporated therein for gripping and releasing the clothes line, which would be unnecessary if the hook was within reach.

The hook 2 comprises a vertically disposed portion 4 which is secured to the post 1, a horizontal portion 5 extending from the portion 4, a portion 6 extending downwardly and outwardly from the portion 5, a portion 7 disposed obliquely to the portion 6 and extending upwardly and outwardly therefrom, and a horizontal portion 8 extending inwardly from the portion 7. A notch 9 is provided in the top of the portion 8, the cross section of said portion at this point being shown in Fig. 2. The opening between the portions 6 and 7 is wedge-shaped forming a clothes line grip, and the notch 9 is disposed vertically over said opening.

In order to secure the clothes line 10 the same may be drawn over the point 11 of the portion 7 of the hook until the same is under proper tension, when the portion 12 of said line may be drawn downwardly causing the line to be securely gripped in the hook. To release the line, the portion 12 or free end of the line may be thrown over the portion 8 of the hook and be caught in the notch 9 as indicated by dotted lines in Fig. 1 and shown in Fig. 2. A downward pull of the free end 12 causes the line to be released from its position in the grip of the hook, as shown in Figs. 1 and 3.

An important feature of our invention is the position of the notch 9 which is directly over the hook grip formed by the portions 6 and 7. The advantage of this position of the notch 9 is readily seen, since when the loose end 12 is drawn downwardly the portion 13 of the line should be in a vertical plane, or in a plane passing through the line $x$ $x$ which is equi-distant from the portions 6 and 7 constituting the grip. And the curved surface of the notch 9 is essential to avoid friction of the rope in passing over the same.

While we have shown what we deem to be the preferable form of our clothes line hook, we do not wish to be limited thereto, as there might be slight modifications of the same which would be comprehended within the scope of our invention.

Having described our invention what we claim as new and desire to secure by Letters Patent is:

1. In a device of the class described, a vertical perforated portion adapted to be secured to a post or other object by means of screws, a horizontal portion extending from said vertical portion, a portion extending downwardly and outwardly from said last named portion, a portion disposed obliquely to said downwardly extending portion and extending upwardly and outwardly therefrom, a horizontal portion extending inwardly from said upwardly extending portion having a notch formed in the upper side thereof located vertically over the junction of said downwardly extending portion and the portion disposed obliquely thereto, substantially as and for the purposes specified.

2. In a device of the class described, a hook comprising a horizontal shank and a V-shaped portion integral therewith, the outer leg of said V-shaped portion being longer than the inner leg over which the line may be drawn tight and thence while still tight be shifted and gripped in said V-shaped portion, and means vertically over the vertex of said V-shaped portion over which the line may be drawn for releasing the same, substantially as and for the purposes specified.

3. In a device of the class described, a hook having a horizontally extending portion or shank and a line gripping means consisting of two portions disposed obliquely to each other, a horizontal portion disposed parallel to said first named portion having a notched portion formed therein, and a curved surface in said notched portion over which the line may be drawn with a minimum of friction, substantially as and for the purposes specified.

In testimony whereof we have signed our names to this specification in the presence of two subscribing witnesses.

LAMBERT G. THELEN.
        JOHN FLOOD.

Witnesses:
    JOSHUA R. H. POTTS,
    JANET E. HOGAN.